May 6, 1952  H. A. TOULMIN, JR  2,595,734
ORNAMENTAL WRINKLE FILMS
Original Filed April 7, 1947  5 Sheets-Sheet 1

INVENTOR
HARRY A. TOULMIN JR.
BY
Toulmin & Toulmin
ATTORNEYS

May 6, 1952     H. A. TOULMIN, JR     2,595,734
ORNAMENTAL WRINKLE FILMS
Original Filed April 7, 1947     5 Sheets-Sheet 2
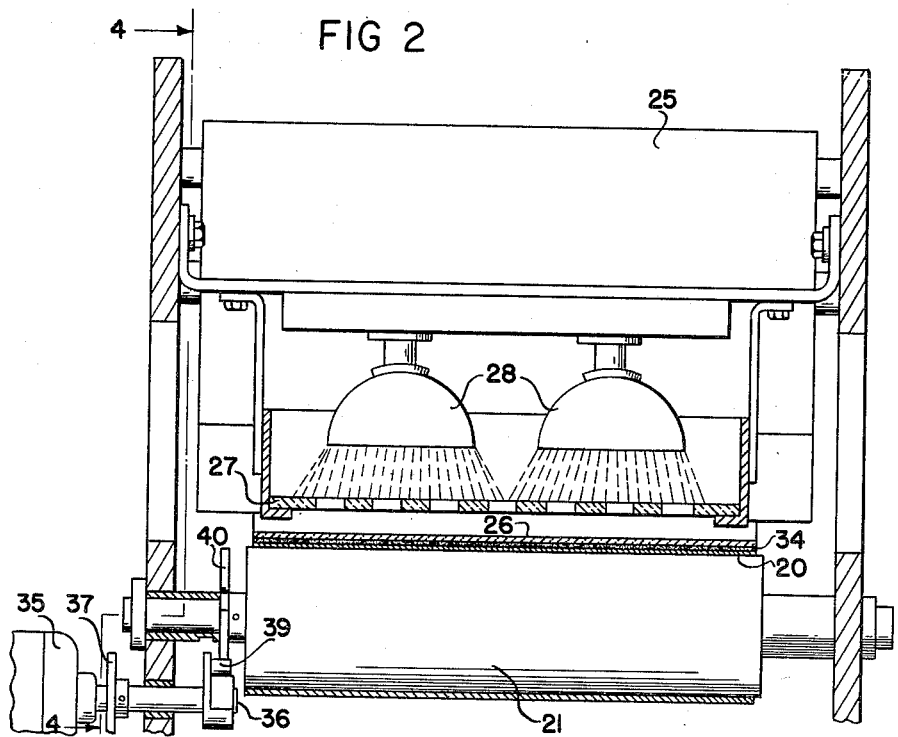
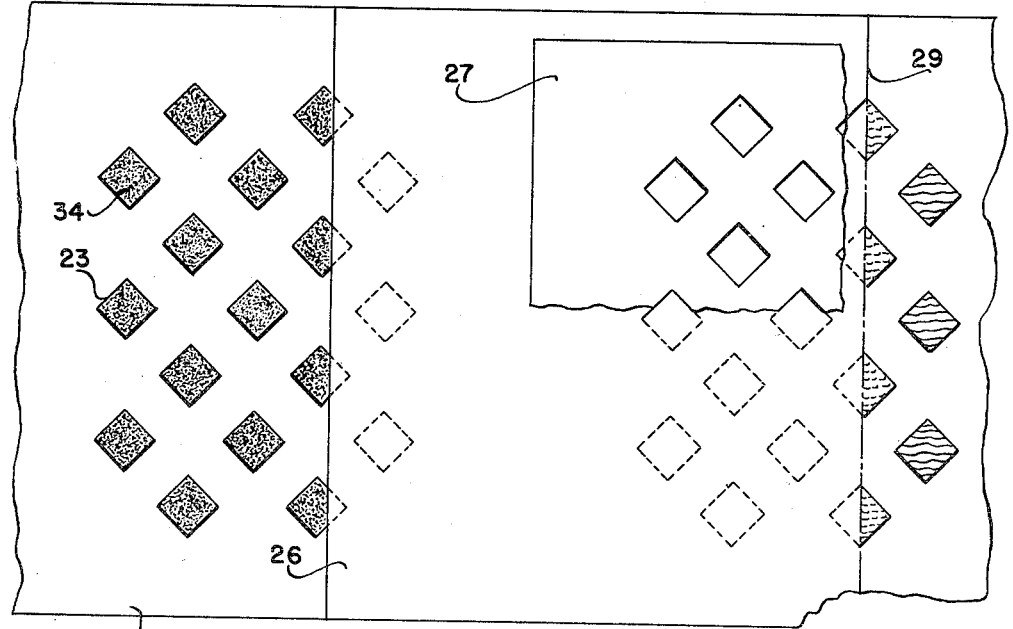
INVENTOR
HARRY A. TOULMIN JR.
BY
Toulmin & Toulmin
ATTORNEYS May 6, 1952     H. A. TOULMIN, JR     2,595,734
ORNAMENTAL WRINKLE FILMS
Original Filed April 7, 1947     5 Sheets-Sheet 3
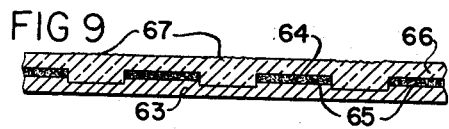
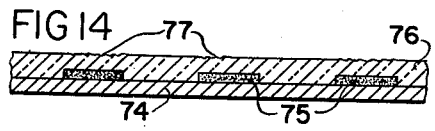
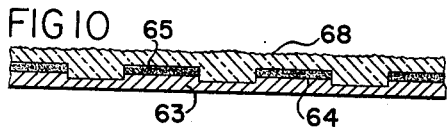
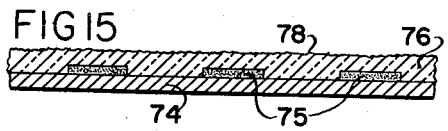
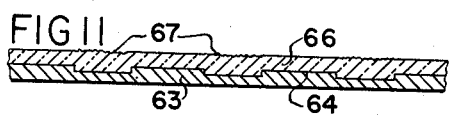
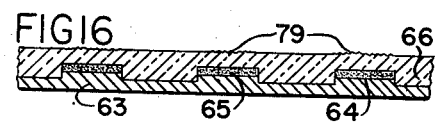
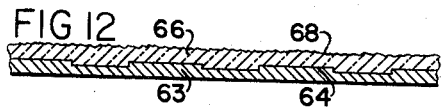
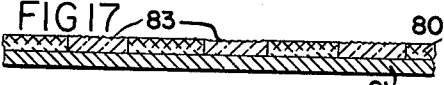
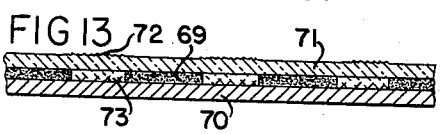
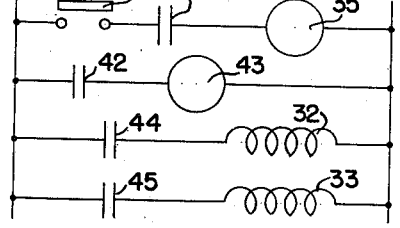
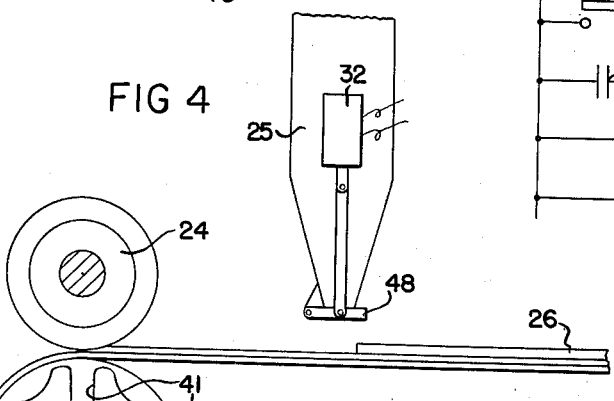
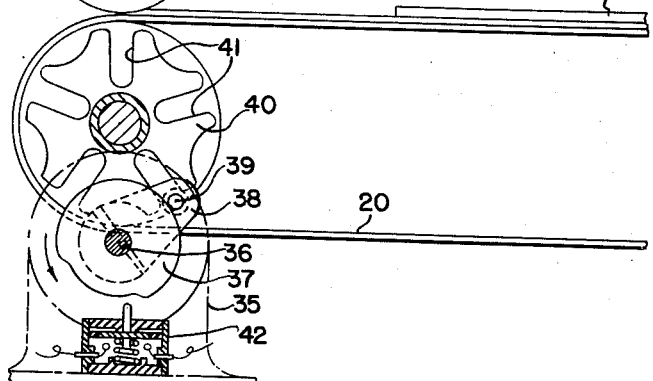
INVENTOR
HARRY A. TOULMIN JR.
BY
Toulmin & Toulmin
ATTORNEYS May 6, 1952 H. A. TOULMIN, JR 2,595,734
ORNAMENTAL WRINKLE FILMS
Original Filed April 7, 1947 5 Sheets-Sheet 4

INVENTOR
HARRY A. TOULMIN JR.
BY
Toulmin & Toulmin
ATTORNEYS

May 6, 1952 H. A. TOULMIN, JR 2,595,734
ORNAMENTAL WRINKLE FILMS
Original Filed April 7, 1947 5 Sheets-Sheet 5

INVENTOR
HARRY A. TOULMIN JR.
BY
Toulmin & Toulmin
ATTORNEYS

Patented May 6, 1952

2,595,734

UNITED STATES PATENT OFFICE 2,595,734

ORNAMENTAL WRINKLE FILMS

Harry A. Toulmin, Jr., Dayton, Ohio, assignor to New Wrinkle, Inc., Dayton, Ohio, a corporation of Delaware Original application April 7, 1947, Serial No. 739,970. Divided and this application November 17, 1949, Serial No. 127,972

4 Claims. (Cl. 41—17)

This invention deals with a process and apparatus for making wrinkled films having a predetermined pattern and with the products obtained therewith.

This application is a division of my co-pending application Serial No. 739,970, filed April 7, 1947, now Patent No. 2,511,024.

It is an object of this invention to provide films having an ornamental pattern of a very pleasing appearance, the design of which may be easily controlled or modified.

It is another object of this invention to provide wrinkle-textured films, the pattern of which may be modified in numerous ways while using the same materials and the same devices.

It is still another object of this invention to provide wrinkle-textured films which have a predetermined pattern in a very simple and inexpensive manner.

It is still another object of this invention to provide wrinkle-textured films with a predetermined pattern from materials which have been held non-wrinkling heretofore.

These and other objects are accomplished broadly by providing a support with a design, superimposing thereover a layer of a solution of non-wrinkling thermoplastic resin, causing predetermined areas of the surface of said layer to wrinkle by differential heating of said layer until skin formation has set in in the areas to be wrinkled and then applying water to the surface whereby the skinned areas obtain a wrinkled texture.

As the support for the resin film, various materials are usable. Thus, metal, e. g. copper, stainless steel, or paper, glass, wood and many others have been found satisfactory. While the support may be used in the form of a plain sheet, it is particularly advantageous to employ a continuous belt for the purpose of my invention.

The design may be applied to the support by various methods; thus, it may be applied by etching, carving, embossing, or engraving. For instance, an etched metal belt as it is being used for lithographic printing was found advantageous. The pattern desired may also be printed onto the belt or support with an ink that is compatible with the thermoplastic resin. Moreover, a combination of embossing or engraving with printing may be used. In this case the ink pattern may either coincide with regard to the relief pattern, or else it may be arranged at different areas. In the first case, the pattern obtained by one method is emphasized by that obtained by the other method, whereas in the latter case an additional effect results. For instance, one method may provide for instance advertising matter, while the other method may supply a design pattern for purely ornamental character.

All thermoplastic resins are usable for this invention. Among the many resins which have been found satisfactory are vinyl acetate copolymers, vinyl chloride copolymers or mixtures of these two, chlorinated rubbers, styrene polymers and copolymers, cellulose acetate, cellulose acetate butyrate, cellulose acetate propionate, methyl cellulose, vinyl butyrate, polyethylene, butadiene copolymers such as butadiene acrylonitrile and butadiene styrene copolymers, methyl methacrylate, vinylidene copolymers, vinyl alcohol polymers, vinyl chloride-vinylidene chloride copolymers and mixtures of these substances.

In the following example a formula is given which proved particularly satisfactory:

Example

|  | Grams |
| --- | --- |
| Vinyl acetate - vinyl chloride copolymer (ratio 5 parts by weight : 95 parts by weight) | 25 |
| Butyl acetate | 50 |
| Methyl ethyl ketone | 102.5 |
| Cyclohexanone | 62.5 |
| Dioctyl phthalate | 10 |

The mixture was preferably heated before application, because the solution is gelled at room temperature.

As the solvents for the resin those are preferred which have a high evaporation rate; methyl ethyl ketone, acetone, butyl acetate, cyclohexanone, xylol, toluol, toluol with nitroparaffin, amyl acetate are a few examples for those solvents that were used with satisfaction. A concentration of from 10 to 65 parts by weight of resins in 100 parts by weight of the solution is operative, the concentration and viscosity best suitable being dependent upon the method by which the film is to be applied to the support. For spraying, a viscosity of approximately 36.2 centipoises at 25° C. was found to be proper.

The film may be applied to the support by spraying, knifing, rolling or other methods known to those skilled in the art. A less viscous solution is required if spraying is chosen than if other methods of application are used.

Heating of the film for the purpose of skin formation is preferably carried out by means of infrared rays, the time of exposure being greatly dependent on the composition used, in particular on the boiling point and the evaporation rate of the solvent used, and on the nature of the base material. Normally a heating time of from 30 seconds to 4 minutes suffices.

Heating may be effected over the entire surface of the resin layer whereby a skin is formed all over, or at predetermined sections of the surface only, whereby a pattern results which is composed of smooth and wrinkle-textured areas.

In order to effect selective heating, a template is advantageously used. This template may be made of heat insulating material and have cut-outs corresponding to the desired pattern, in which case skin formation sets in at those areas of the film which are underneath said cut-outs, whereas the areas protected by the insulating material of the template will still be too cold as to develop a skin. On the other hand, a template may also be used which consists of a material of very good heat conductivity, for instance, which is made of a particularly well conducting metal; in this case a skin will develop first in those areas which are located underneath the metal parts of the template, whereas the sections underneath the cutouts will remain free from skin for a longer period of time. It will be obvious that in the former case the pattern itself, with which the cut-out parts are meant, obtain a skin and will wrinkle later on under the influence of water, whereas in the latter case the background rather than the pattern itself will skin and wrinkle. However, in either case the conditions may be reversed by merely heating the film so long as to cause hardening of the earlier formed skin and initial development of the skin in the parts heated more slowly; then the water will affect merely the soft skin which has just formed whereas the already hardened skin will remain smooth upon the application of water.

The template may be held stationary, in which case the support has also to be kept in place in order exactly to reproduce the pattern of the template and not to transform it into stripes or streaks. However, the entire process may also be carried out in a continuous manner by using an endless belt and a traveling template in which case both have to be driven with the same speed.

Faucet water is operative for the purpose of producing the wrinkles in the process of my invention. However, it is preferred, and better results are obtained, if a wetting agent is added to the water. All wetting agents known in the art are usable. I have obtained excellent results, for instance, with the sodium sulfate of 3,9-diethyltridecanol-6, and in particular with a concentration of approximately 3% thereof. The water may be applied either by spraying it thereon or by immersing the film, an immersion time of from 5 to 20 minutes being sufficient in the latter case.

After the water has been applied, the film is peeled from the support. This may be carried out by means of a knife or blade. Peeling is considerably facilitated though, if the support with the film is immersed into an aqueous solution of trisodium phosphate of approximately 10% concentration prior to peeling.

Thereafter the isolated film is dried; this step may be either performed by letting the film air-dry or by the use of forced drying or by a combination of the two. It was found particularly advantageous first to heat the film for a short period of time in order to accelerate evaporation of the solvent and thereafter to allow the film to air-dry. Sometimes forced drying for only a fraction of a minute was found sufficient to initiate evaporation.

Instead of using a trisodium phosphate solution for the purpose of facilitating peeling, it was also found helpful to lubricate the support before the application of ink and resin solution. In this case, however, drying is preferably carried out prior to peeling. It will be understood that a great many additional materials may be added to the ink or to the resin material. Thus, for example, plasticizers, e. g. tricresyl phosphate, dioctyl phthalate, dibutyl phthalate, may be added to the resin. Metal powders may be applied either to the support or incorporated into the ink or into the resin solution. In case of the film material being transparent, such metal powders give an especially pleasing effect. Likewise, the addition of autoluminescent materials was found to have a very favorable influence on the appearance of the final film.

A pattern may also be developed by incorporating into the ink or the resin material a pigment or dye the color of which is developed under the influence of specific light rays, for instance of infrared light or of ultra-violet light. In the case of materials sensitive to ultra-violet light, a step has to be inserted prior to heating with infrared light, namely, a step of exposure to ultra-violet light for the purpose of developing the color of such materials. A pattern may be obtained in such a case, for instance, by uniformly coating the entire surface of the support with a layer of ink and/or thermoplastic resin either or both of which may contain the ultra-violet sensitive material. A pattern may then be developed by selectively applying ultra-violet rays which may also be carried out by means of a template.

Although, in this case the application of a pattern by means of etching, ink, or the like is not necessary, both methods may still be combined and additional effects be obtained thereby. Moreover, the pattern or appearance of such films may be modified by causing wrinkle formation over their entire surface or in predetermined areas thereof only. All kinds of phosphorescent or luminescent materials known to those skilled in the art may also be added to the ink or resin substances in order to obtain additional light effects in the product of my invention. It will thus be seen, that a great number of possibilities exist by which various modifications may be obtained by the process of this invention.

The products obtained by the process of this invention may be used for ornamental purposes or for displaying printed matter, for instance for signs or other advertisement, or for a combination of both.

In the accompanying drawings two embodiments of an apparatus and process of my invention are illustrated by way of example without the intention of limiting the invention thereto.

In these drawings:

Figure 2 is a cross-sectional view thereof taken along line 2—2 of Figure 1;

Figure 3 is a plan view of the film while on the support with parts being peeled away in order to show the support and the film in the various steps and stages of its manufacture;

Figure 4 is a sectional view of the apparatus of Figure 1 as viewed in the direction of the arrows 4 of Figure 2;

Figure 5 is a diagram showing the electrical connections of the control system of the apparatus of Figure 1;

Figures 9 to 18 are cross-sectional views of various kinds of film obtained by the process of this invention.

Figure 1:
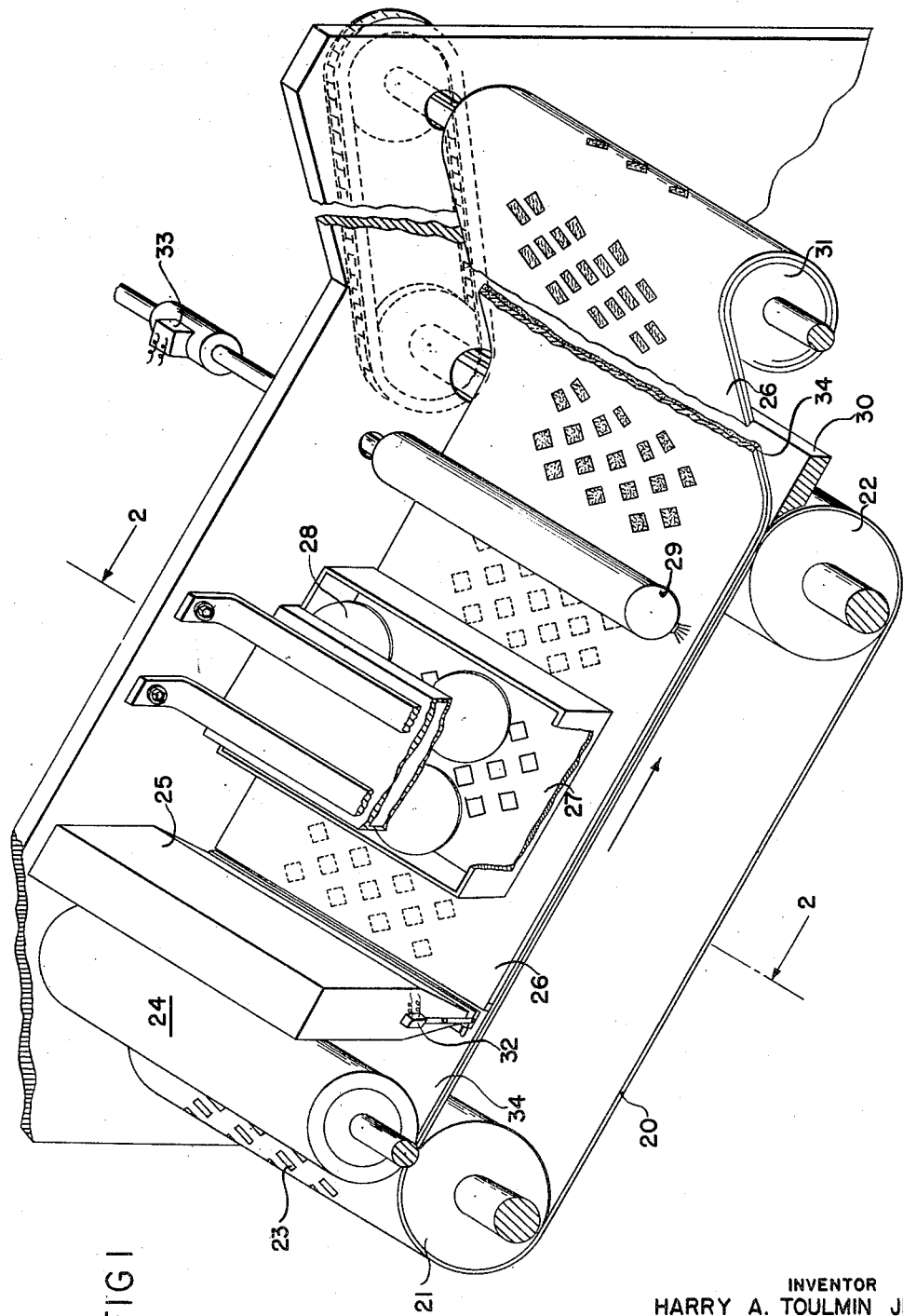
Figure 1 is a diagrammatic illustration of a perspective view of an apparatus as it is used for one embodiment of my invention.

Referring to the drawings in detail, the reference numeral 20 designates an endless support belt which travels over two rolls 21 and 22. This belt has a relief pattern 23 which was produced by etching the remaining parts of the surface of this belt. An inking roller 24 applies ink to said belt; in the instant case the ink is applied to the patterned (diamond shaped) parts only because of their being raised above the surface of the background.

A reservoir 25 contains a resin solution which is dispensed therefrom and applied to the surface of the support in the form of a layer 26. A stationary template 27 is arranged over said resin layer above which infrared lamps 28 are mounted. The reference numeral 29 indicates a water dispenser. It will be seen from the drawing that wrinkles gradually start to form after the application of the water. In the instance shown, evaporation of the solvent and water is carried out by air-drying. A blade 30 is installed at the end of the belt as a means for effecting removal of the film from the support. The finished product, after drying, is finally wound on a reel or spool 31.

The resin reservoir 25 is equipped with a solenoid 32 and the water reservoir 29 with a solenoid 33 which effect closing of the reservoirs while the belt is in a stationary position for the purpose of infrared heating.

The mechanism of the control system for discontinuing traveling of the belt and supply of resin and water is illustrated in Figures 4 and 5. There, a cam 37 is mounted on a driving shaft 36 of a motor 35. The driving shaft 36 also carries an arm 38 with a roller 39 mounted thereon. A Geneva gear 40 with slots 41 is driven, and the belt 20 therewith, whenever the roller 39 slides into the slots 41. The cam 37 operates a switch 42 which in turn controls a timer 43 for regulating the stopping time of the belt.

It will be seen from the electrical diagram (Fig. 5) that a manual switch 47, when closed, shuts a switch 46 whereby the motor 35 is started. The switch 42, which is opened and closed indirectly by the Geneva gear, operates a timer 43 which controls opening and closing of the switches 44, 45 and 46; when the switches 44 and 45 are closed, the solenoids 32 and 33 are energized and the reservoirs 25 and 29 closed. Thus, while the switch 46 is in the open position and the motor 35 is stopped, the switches 42, 44 and 45 are closed. The switch 44 in closed position energizes the solenoid 32 which in turn closes the bottom dispenser flap 48 of the reservoir 25. Likewise, the switch 45 energizes solenoid 33 and closes a dispenser valve on the water reservoir 29.

Figure 3 shows the support belt 20 with the various layers applied thereon. Starting from the left, the raised pattern 23 is first visible as it has been applied to the belt by etching the background. The next step shows an ink layer 34 on the raised diamond patterns 23. Thereafter, a layer 26 of resin solution is applied, which is exposed to infrared heat while a template 27 is interposed. The next step shows the application of water and the last step the air-drying step and the gradual development of the wrinkle finishes in the areas which developed a skin under the influence of infrared heat.

Figure 6:
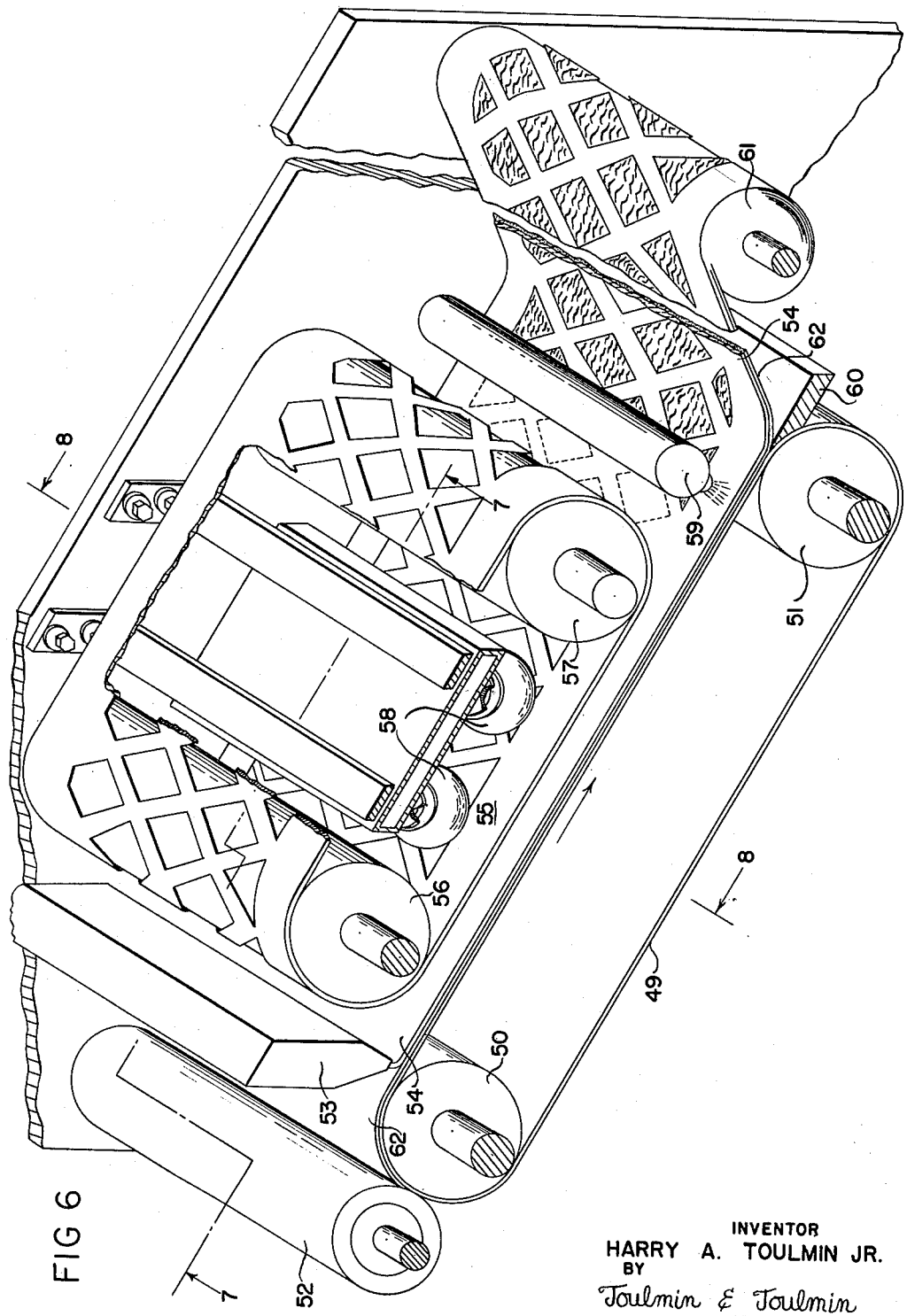
Figure 6 is a perspective view of a modification of the apparatus of my invention.
Figure 7:
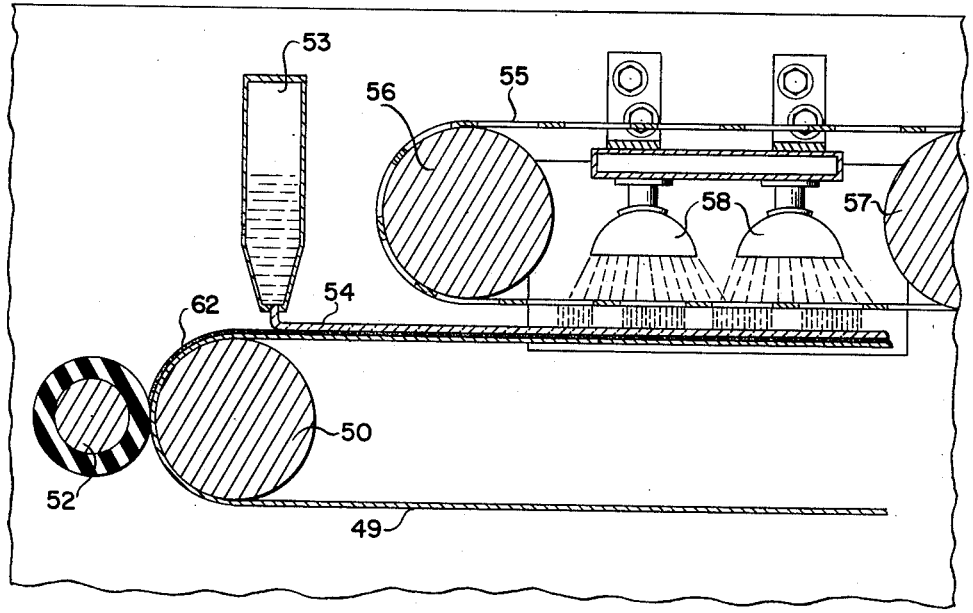
Figure 7 is a longitudinal sectional view taken along line 7—7 of Figure 6.
Figure 8:
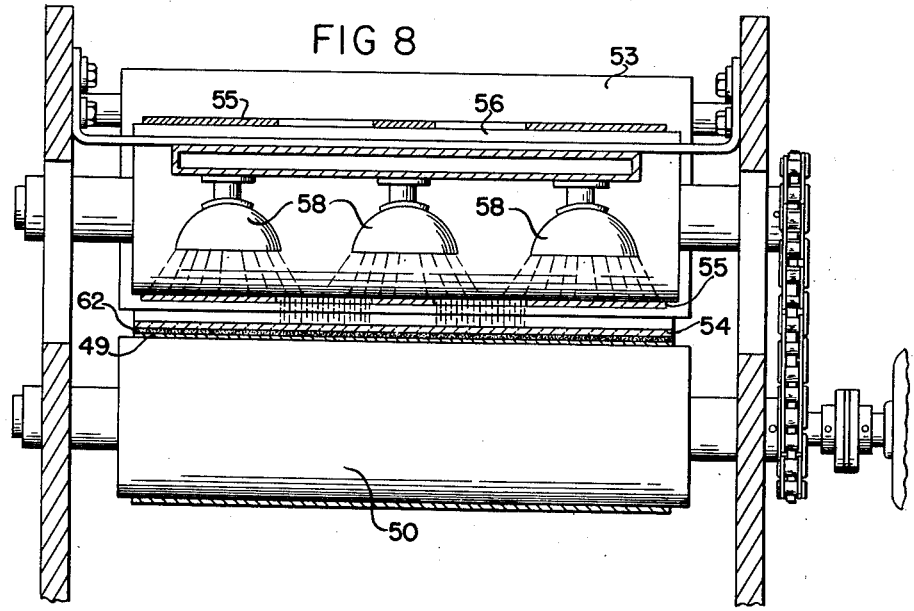
Figure 8 is a cross-sectional view taken along line 8—8 of Figure 6.

Figures 6 to 8 show a modification in which a template traveling synchronously with the support belt provides for a continuous process. In these figures, an endless belt is designated with the reference numeral 49; in this instance a smooth-surfaced belt without any pattern is used. Similarly to the modification previously shown, this belt 49 runs on rolls 50 and 51. An inking roller 52 is arranged adjacent the roll 50; it spreads a layer of ink 62 on the support belt. The resin solution is dispensed from a reservoir 53 in the form of a layer 54. A template 55 in the form of an endless belt runs over two rolls 56 and 57 with substantially the same speed as the support belt 49 so that the infrared light emitted from lamps 58 duplicates the pattern of the template. A water dispenser 59, a peeling blade 60 and a spool 61 for receiving the finished product are arranged in this modification analogously to the corresponding elements shown in the previous figures.

Various types of products may be obtained with the process and the apparatus of this invention. Some examples are illustrated in Figures 9 to 18 in which cross-sections of the films obtained are shown. Figure 9 illustrates one type of a film while still mounted on the support belt. In this instance an etched belt 63 was used and ink 65 was supplied to the raised areas 64 of said belt. A resin layer 66 was then applied thereover and the surface wrinkled at the areas 67 which correspond to the depressions of the pattern in the belt. This was carried out by using a template of high heat conductivity in which parts were cut out that corresponded to the pattern of the etched belt. It will be understood that the film after peeled from its support will have an embossed background with an inked pattern therein and a surface with a wrinkled pattern, this wrinkled pattern supplementing the pattern of the background.

In Figure 10 the same kind of belt and the same arrangement of ink were used, however, in this instance the entire surface 68 of the resin film was wrinkled.

Figure 11 corresponds to the film illustrated in Figure 9 with the distinction that no ink was used in this instance.

The film of Figure 12 does not contain any ink either but, in contradistinction to Figure 11, the entire surface of the film is wrinkled in this instance.

Figure 13 shows an ink layer 69 applied on a smooth-surfaced belt 70 and a resin layer 71 thereover with a wrinkle finish in selected areas 72 only. In this instance the ink contained coloring matter which developed in the areas 73 under the influence of ultra-violet light.

Figure 14 illustrates a smooth belt with a design 75 printed thereon with ink and a resin layer 76 thereover on which the areas 77 of the surface which correspond to the ink design 75 have been wrinkled.

Figure 15 is similar to Figure 14 with the distinction that here the entire surface 78 has been wrinkled.

Figure 16 is very similar to Figure 9; however, in this instance the wrinkle formation has been obtained in the areas 79 of the surface which correspond to the raised and inked pattern, whereas in Figure 9 the wrinkles were produced in the remaining parts of the surface.

Figure 17 shows a film 80 produced immediately on a smooth-surfaced belt 81, this film containing coloring matter which was developed by ultra-violet rays through a template, thus causing only predetermined areas 82 to obtain this color effect. Wrinkle formation was then caused in the surface in the areas 83 not corresponding to the colored sections.

Figure 18 shows a film 86 which was produced on a smooth support 84 provided with a pattern 85 and the surface of which was wrinkled at the areas 87 which correspond to the sections not having an ink pattern.

It will be understood that while there have been described herein certain specific embodiments of the invention, it is not intended thereby to have it limited to or circumscribed by the specific details given in view of the fact that this invention is susceptible to various modifications and changes which come within the spirit of this disclosure and the scope of the appended claims.

I claim:

1. A plastic film characterized by a patterned inked background and wrinkles on its surface only at areas of said surface other than the area opposite said patterned background.

2. A plastic film characterized by a predetermined pattern in an inked resin background and wrinkles on its surface only at areas of said surface other than the area opposite said patterned background.

3. A plastic film of vinyl acetate-vinyl chloride copolymer characterized by a patterned inked background and wrinkles on its surface only at areas of said surface other than the area opposite said patterned background.

4. A plastic film of vinyl acetate-vinyl chloride copolymer in the ratio of 5 parts by weight of vinyl acetate and 95 parts by weight of vinyl chloride, said film being characterized by a patterned inked background and wrinkles on its surface only at areas of said surface other than the area opposite said patterned background.

HARRY A. TOULMIN, Jr.

REFERENCES CITED

The following references are of record in the file of this patent:

UNITED STATES PATENTS

| Number | Name | Date |
| --- | --- | --- |
| 2,275,957 | Groff | Mar. 10, 1942 |
| 2,285,335 | Hurt | June 2, 1942 |
| 2,285,420 | Doolittle | June 9, 1942 |
| 2,339,775 | Ether | Jan. 25, 1944 |
| 2,369,899 | Hoffman | Feb. 20, 1945 |
| 2,444,094 | Duggan | June 29, 1948 |
| 2,477,300 | Karfiol | July 26, 1949 |
| 2,482,094 | Chevannes et al. | Sept. 20, 1949 |
| 2,486,258 | Chavannes | Oct. 25, 1949 |